United States Patent
Bantz et al.

[15] 3,643,105
[45] Feb. 15, 1972

[54] MODULAR CASCADED REVERSIBLE POLARITY ULTRAHIGH DC VOLTAGE SUPPLY SYSTEM

[72] Inventors: George H. Bantz, Brewster; John S. Faile, Carmel; Stanley G. Peschel, Brewster, all of N.Y.

[73] Assignee: Hipotronics, Inc., Brewster, N.Y.
[22] Filed: Aug. 6, 1970
[21] Appl. No.: 61,654

[52] U.S. Cl..................................................307/110, 320/1
[51] Int. Cl........................................................H02m 7/04
[58] Field of Search..............................307/109, 110; 320/1

[56] References Cited

UNITED STATES PATENTS

| | | | |
|---|---|---|---|
| 2,275,635 | 3/1942 | Lindenblad | 320/1 |
| 2,490,408 | 12/1949 | Boldingh | 307/110 X |
| 2,552,069 | 5/1951 | Streuber | 307/110 X |
| 3,048,766 | 8/1962 | Panzer | 307/110 X |

*Primary Examiner*—Bernard Konick
*Assistant Examiner*—Stuart Hecker
*Attorney*—Bryan, Parmelee, Johnson & Bollinger

[57] ABSTRACT

A modular cascaded reversible polarity ultrahigh DC voltage supply system is described wherein modular DC voltage power supply units are vertically stacked one upon another and connected in cascaded series relationship to form an ultrahigh DC voltage supply. Each of the modular units, as shown, includes a three-position switch electrically connected in each of the modular power supply units to "ground" and then to reverse the polarity of the system output voltage, such that the whole electrical load is grounded between polarity reversals. A control is provided external of the vertically stacked modular units and couples to each of the switches at vertical intervals to simultaneously control the polarity positions of the respective switches for reversing the polarity of the system voltage. A grounded intermediate terminal is effectively located in each of the switches to ground the system and also to ground the load connected to it before the polarity of the voltage applied to the load is reversed. The ability to ground the load and then to apply a reversed ultrahigh DC voltage is advantageous for use in test systems, and the modular construction enables various predetermined ultrahigh DC levels to be obtained conveniently by assembling the desired number of stacked modular units.

18 Claims, 8 Drawing Figures

INVENTORS:
George H. Bantz
John S. Faile
BY Stanley G. Peschel

Bryan, Parmelee, Johnson & Ballinger
ATTORNEYS

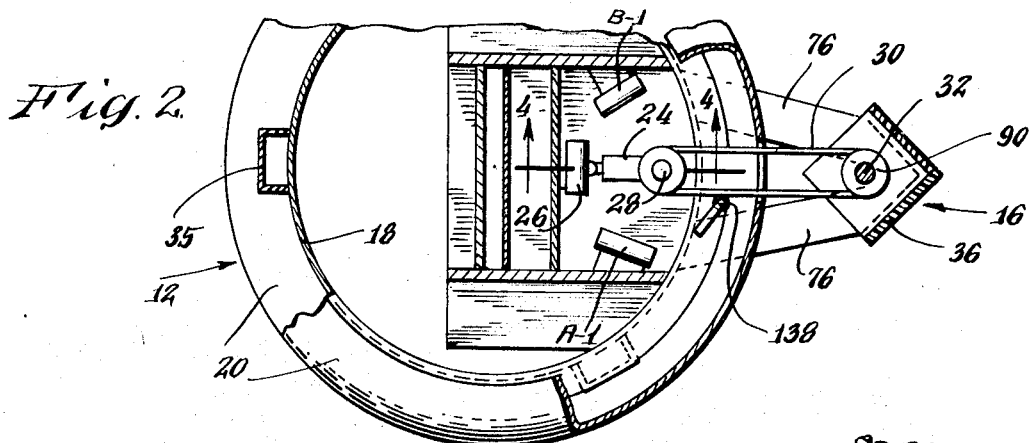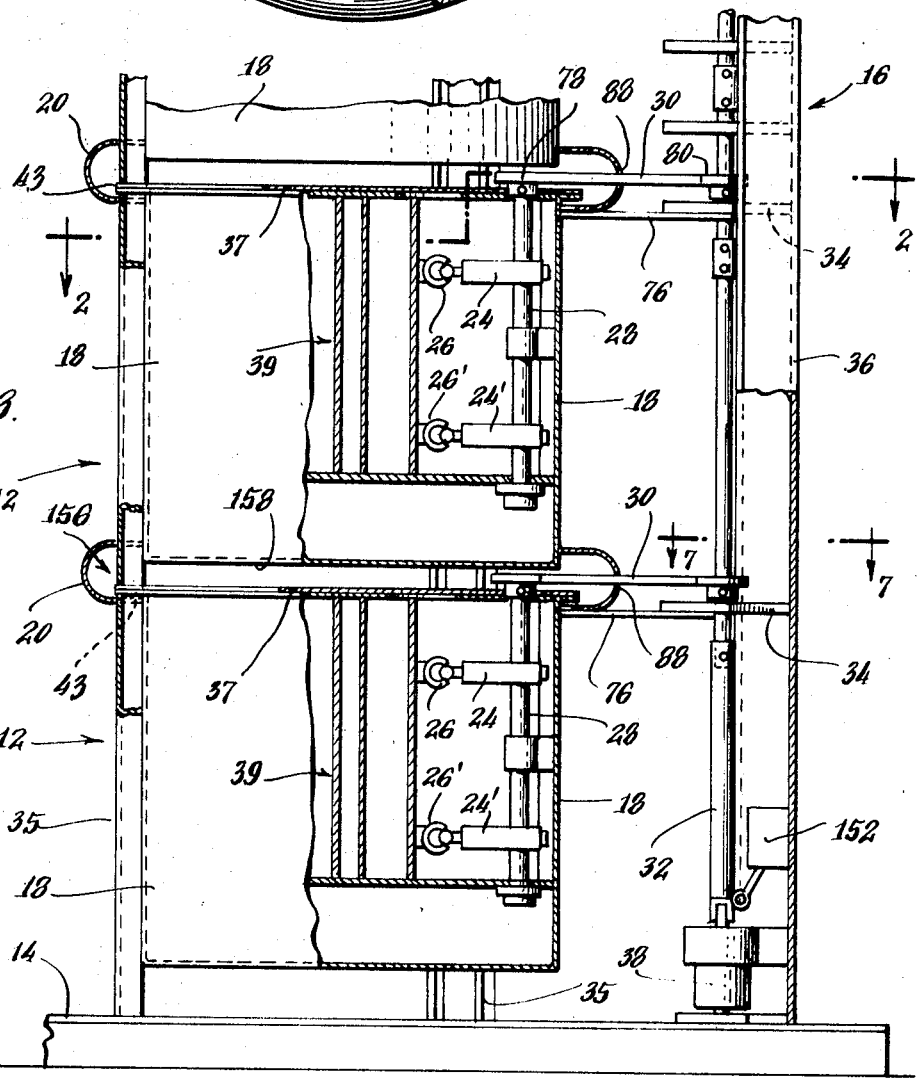

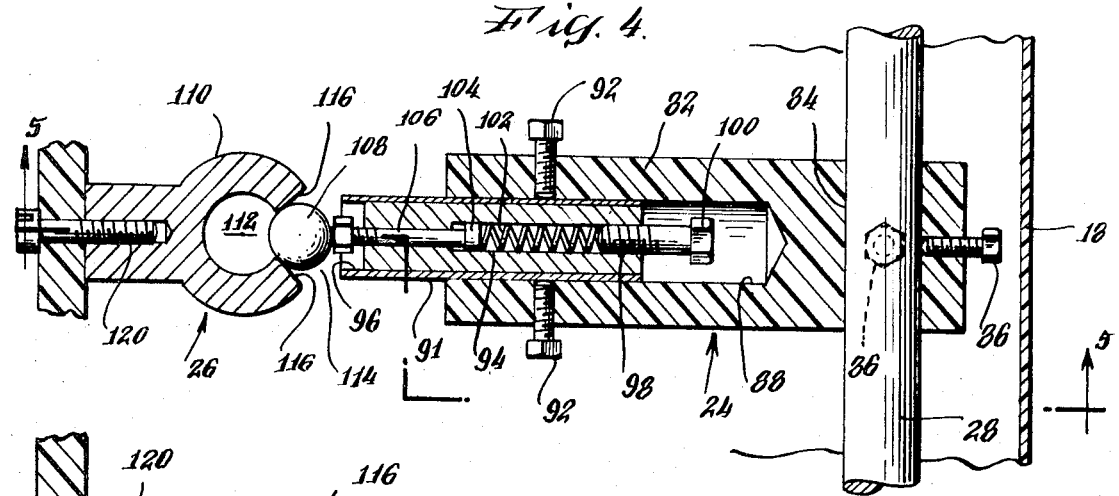
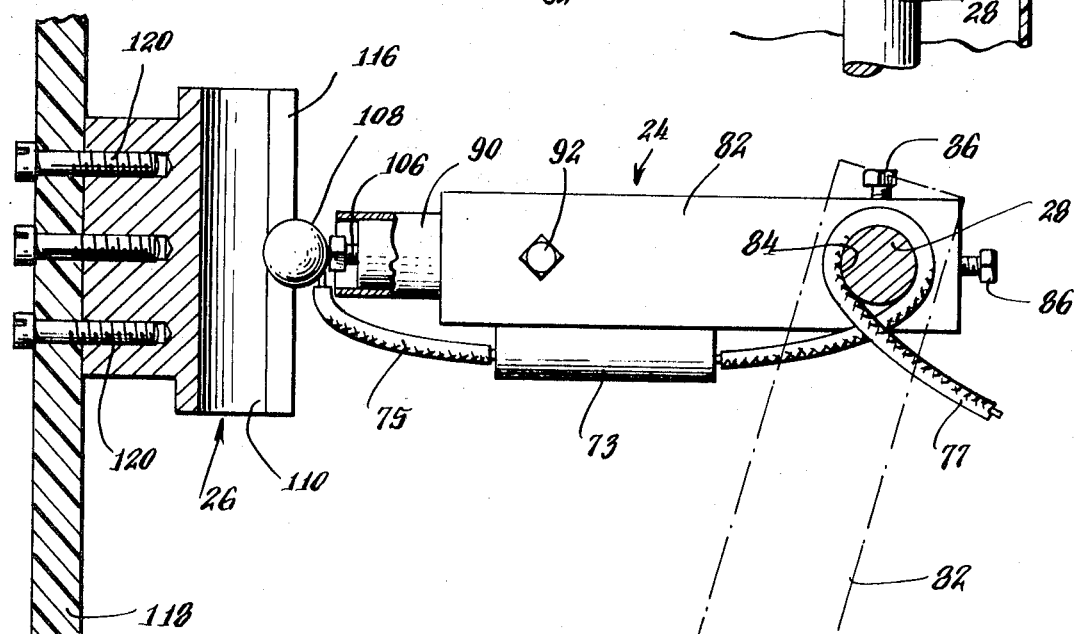

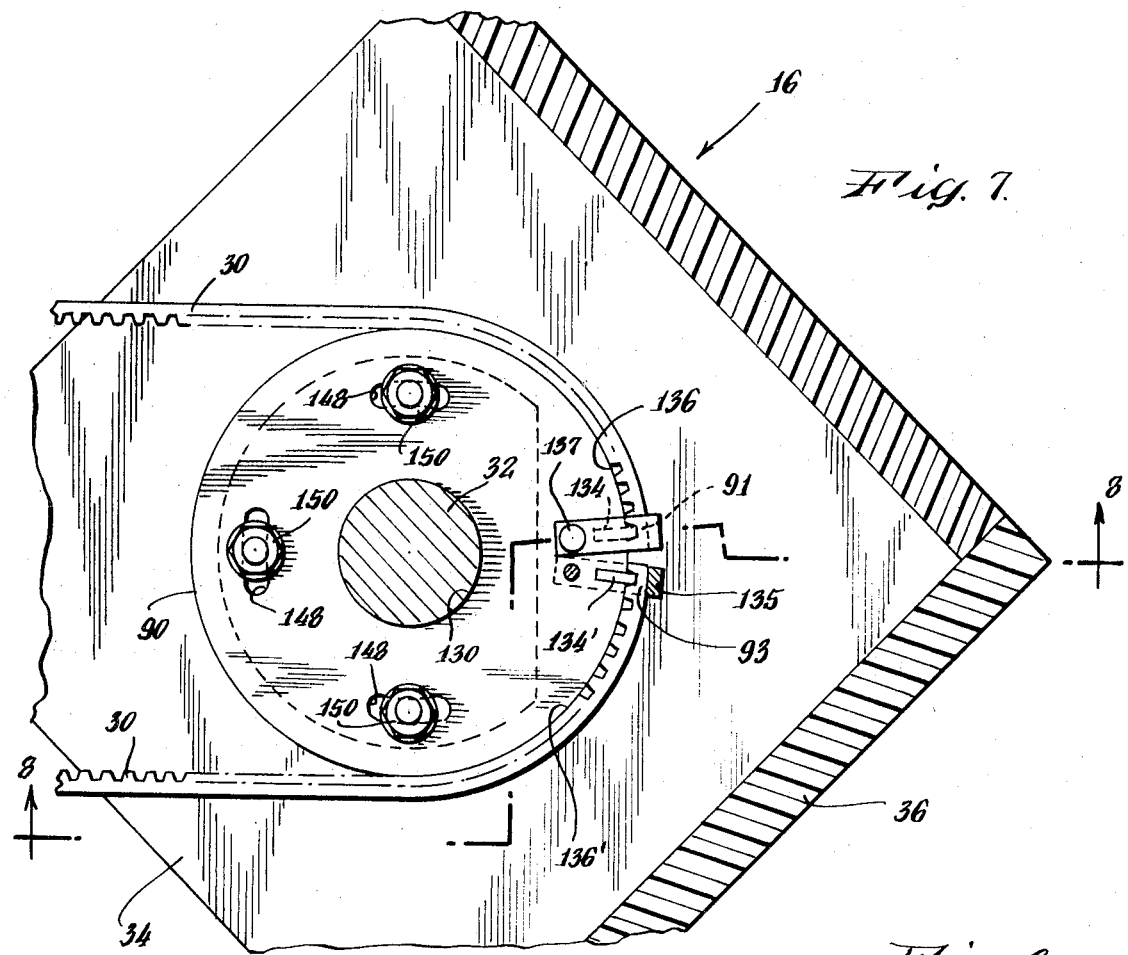
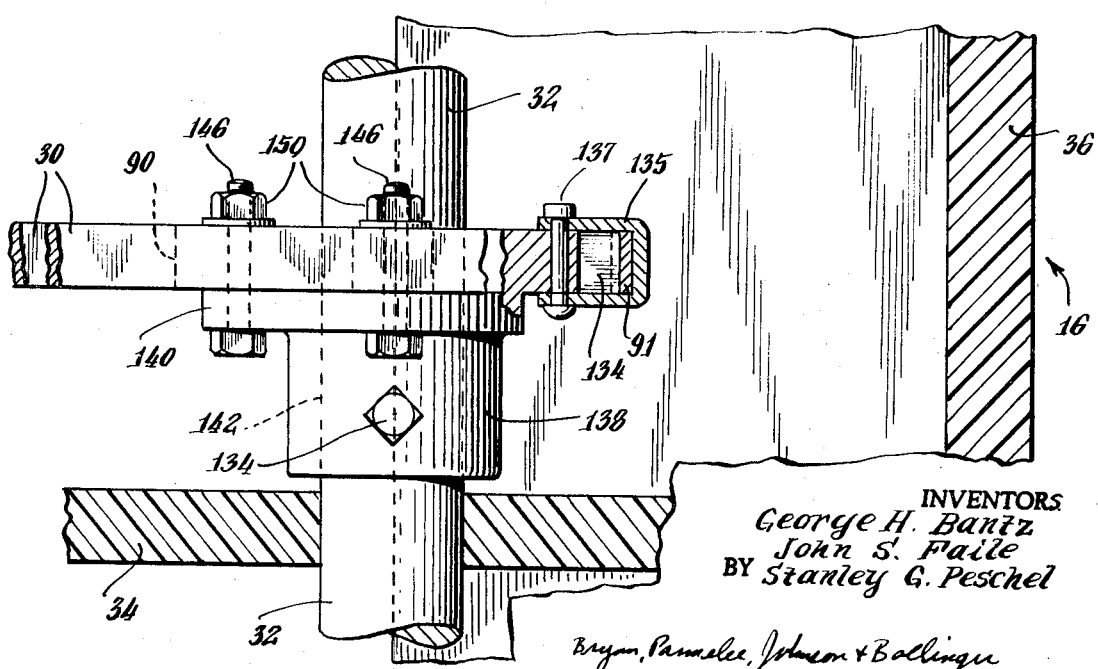

MODULAR CASCADED REVERSIBLE POLARITY ULTRAHIGH DC VOLTAGE SUPPLY SYSTEM

This invention relates to a modular, cascaded reversible polarity ultrahigh DC voltage supply system. More specifically, this invention relates to a modular ultrahigh DC voltage supply system wherein the polarity of the output voltage is reversible and wherein the output terminal may be "grounded" before the reversed polarity voltage is supplied from the output terminal.

In an ultrahigh DC voltage supply system, in accordance with the invention, the ultrahigh system voltage is achieved by vertically stacking modular DC power supply units one upon another and connecting them in cascaded series relationship. Each of the modular units includes a tank of dielectric material which houses a high DC voltage power supply. Each tank further includes a switch to control the polarity of the voltage provided by the power supply unit. The switches in the tanks are operated by a common control located externally of the tanks. This control extends vertically along the stack of modular units to operatively couple with the switches in the respective tanks. Corona rings are located at vertical intervals around the tanks to stabilize the voltage gradient along the stacked modular units. There is a corona ring at the top of each individual tank, and it serves to cut down corona.

An advantage of the modular ultrahigh DC voltage system of this invention resides in that an enormously high DC system voltage may be produced by stacking multiple modular units, while the polarity of the entire cascaded system voltage can be reversed in a safe and accurate manner.

In a described embodiment of a modular ultrahigh DC voltage supply system in accordance with the invention the polarity of the system voltage is reversible by means of switches located in each of the respective tanks. System voltage polarity reversal is accomplished by connecting the output terminal of the system, and any load connected to it, to ground before a voltage of reverse polarity is supplied from the output terminal. In this manner, excessive surge currents throughout the system are avoided and smooth reversals of the system polarity are obtained in an advantageous manner for testing purposes.

The control for the respective switches is located externally of the modular units and may be sized to accommodate a large number of stacked modular units. The control as shown is mechanical and the nonconductive construction of this control provides safe polarity reversals. This control also facilitates maintenance of the system and enables convenient stacking or restacking of the modular tank units. The control provides for convenient adjustment of the respective switches so that all of them will operate in synchronism when the control is actuated.

Other advantages of the modular ultrahigh DC voltage power supply system of this invention will be understood from the following description of a presently preferred embodiment in conjunction with the accompanying drawings, in which:

FIG. 2 is a partial top view, as seen looking down along the line 2—2 into the tank of one of the modular power supply units, illustrating the tank switch and the mechanism for its control;

FIG. 3 is an elevational view shown partially in section of the lower portion of the stacked high DC voltage modular units with the associated power supply polarity reversal control;

FIG. 4 is an enlarged elevational sectional view along line 4—4 of FIG. 2, showing a switch arm and a terminal employed in a switch located in a tank;

FIG. 5 is a plan view of a switch arm and terminal of FIG. 4, showing two alternative switch arm locations;

FIG. 7 is an enlarged partial section of the mechanical control used to reverse the polarity of the cascade system voltage, this section being taken along the line 7—7 in FIG. 3; and FIG. 8 is a partial side view of the control taken along the line 8—8 of FIG. 7.

Figure 1:
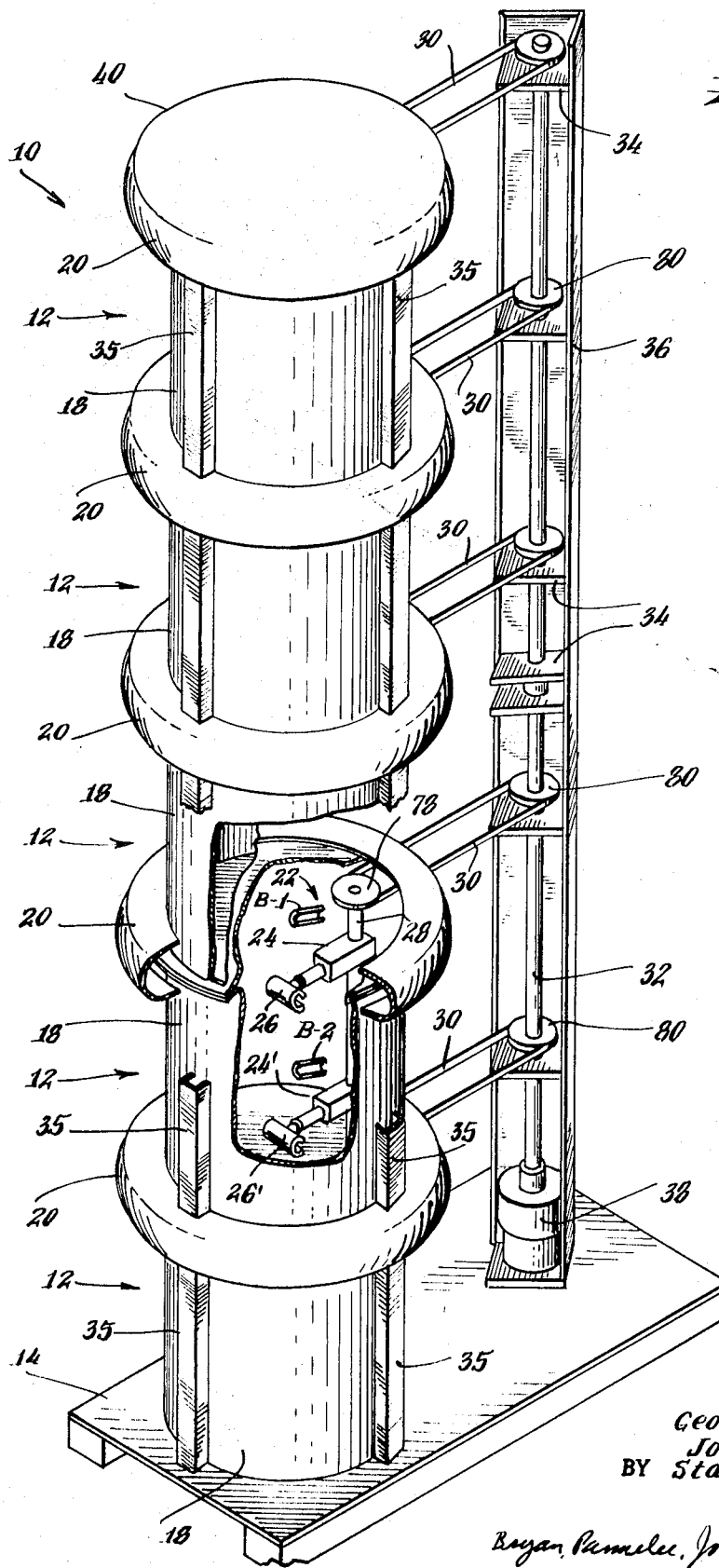
FIG. 1 is a perspective view of a modular ultrahigh DC voltage power supply system in accordance with the invention. A portion of FIG. 1 is broken away to reveal features of internal construction.

With reference to FIG. 1 an ultrahigh DC voltage supply stack system 10 is shown including five vertically stacked modular high DC voltage power supply units 12 resting on a base platform 14. A common switch control mechanism 16 is shown extending vertically alongside of the stack 10 and operatively coupled to the respective switches inside of the modular units 12 at vertical intervals.

The modular units 12 each include a tank 18 of dielectric material capable of retaining a dielectric oil in which the high DC voltage producing electrical components are located. Each tank is surrounded at the top by a corona stress-relieving conductive ring 20 to stabilize the electric field intensity and to avoid excessively high electric field intensity concentrations at points along the stack 10.

Within each tank 18 is located a high DC voltage power supply (not shown in view of FIG. 1). These power supplies are electrically connected in series by polarity reversing switches such as shown at 22, FIG. 1. The switches 22 each includes a pair of mechanically ganged vertically spaced switch arms or poles 24 and 24' which are mounted for swinging movement in horizontal pole planes.

Electrical terminals such as 26 and 26' are located in the pole planes for contact by the poles, as the poles are swung by the externally located control mechanism 16. The control mechanism 16 includes a vertical shaft 32 of insulating material which is rotatable about a vertical axis and is operatively coupled to vertical pole shafts located within the respective tanks, such as the pole shaft shown at 28 in FIG. 1. The coupling is provided by flexible timing belts 30 to actuate the switches 22, so as to move the switch poles 24 and 24' in their respective pole planes.

The control mechanism 16 includes the control rod 32 which is held upright by brackets 34 mounted in an L-shaped corner frame 36 of insulating material. The control rod 32 is turned about its vertical axis through an angular displacement of slightly less than 180° by a motor 38 located down near the platform 14. The belts 30, the control rod 32, the brackets 34 and the corner frame 36 are all made of nonconductive dielectric material.

The modular units 12 are each advantageously supported from the top by three upright columns 35 of dielectric material. These columns 35 have a channel-shaped cross section with the concave face of the channel facing inwardly to rest against the convex surface of the cylindrical tank wall 18. These columns 35 support strong metal header plates 37 extending across the top of each individual tank 18. The header plate 37 serves to support the tank and also to support the components within the tank. Therefore, as the modular units 12 are stacked up, the load weight is carried by the columns 35, rather than being supported by the lowermost tanks. In this manner, five or six or more of the modular units can be conveniently and effectively stacked up in cascaded relationship, depending upon the DC voltage output desired to be obtained at the top of the stack.

A rigid supporting chassis 39 (FIGS. 2 and 3) of dielectric material is attached to the header plate 37 and extends down into each of the tanks 18 to support the various components therein, as will be described. The tank 18 itself has a flange 43 which is secured to the header plate. The corona ring 20 is also mechanically and electrically attached to this header plate 37, so that they both are at common potential levels at the top of the respective tanks.

An electrical load to be tested, not shown, is electrically connected to a top conductive closure cap 40 on top of the stack 10. This cap 40 has a smooth rounded appearance and is connected to the high DC voltage developed at the top of the stack 10.

Figure 6:
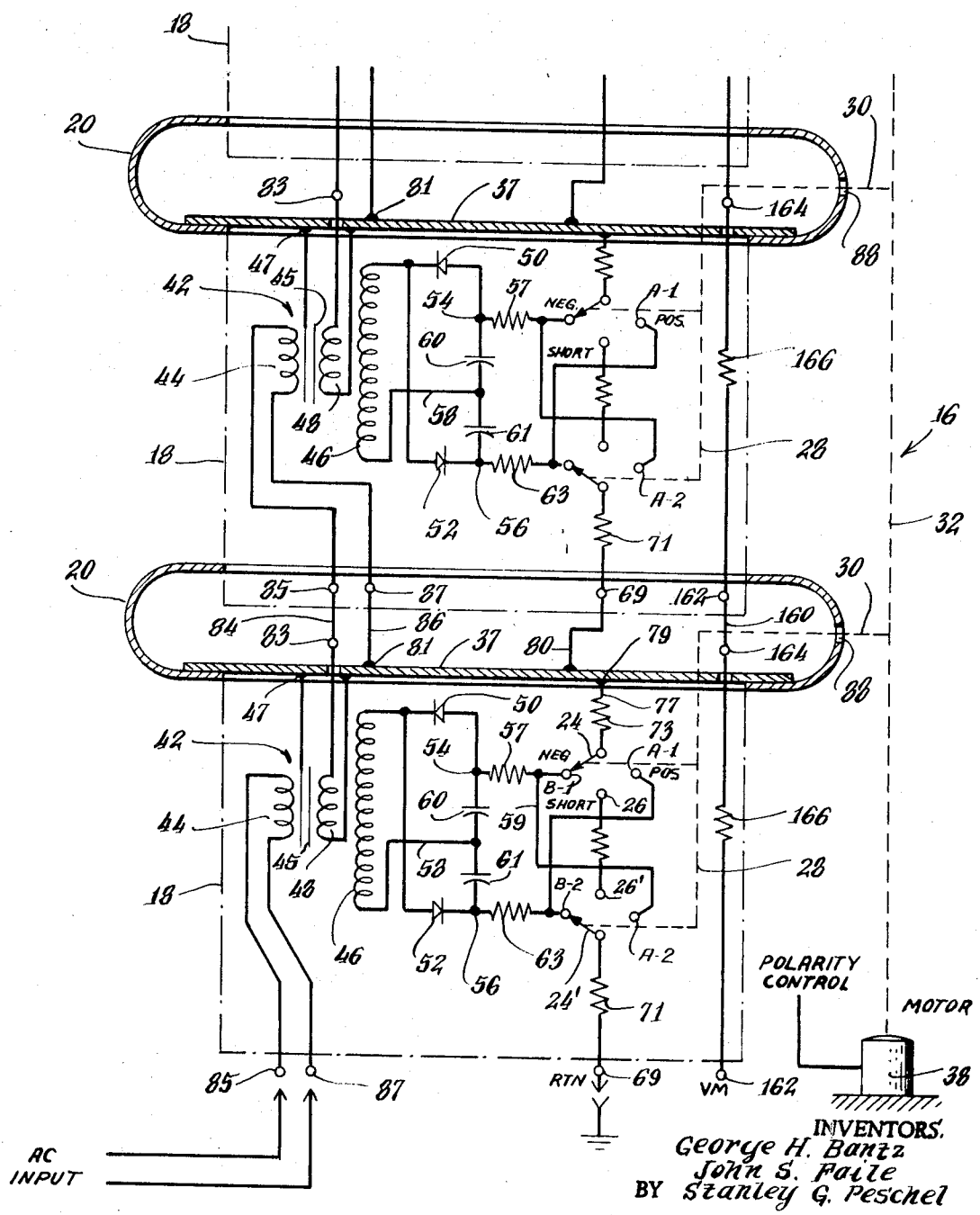
FIG. 6 is a schematic electrical diagram of a pair of the stacked modular units.

The schematic electrical diagram shown in FIG. 6 illustrates the electrical polarity reversals obtained with the tank mounted switches 22.

Each tank 18 includes a DC power supply generally indicated at 41. Each power supply 41 comprises a step-up transformer 42 having a primary winding 44, a core 45, a secondary winding 46 and a tertiary winding 48. The tertiary winding 48 is positioned on the inside of the other two windings so that the tertiary is adjacent to the core 45. It is noted that the core 45 is advantageously electrically connected at 47 to the header plate 37, so that the core is at the same DC potential level as the header plate 37 and the corona ring 20. Also, one side of the tertiary winding 48 is electrically connected to the header plate 37 so as to be at the potential level thereof.

The primary winding 44 is positioned between the tertiary winding 48 and the secondary winding 46, with the secondary on the outside. Thus, the single primary 44 is effectively common to both the secondary and tertiary windings and is well coupled to both of them to energize them.

One side of the secondary winding 46 is connected to a pair of rectifiers 50 and 52 which respectively provide half-wave rectified negative and positive DC voltages at their output leads 54 and 56 relative to a return lead 58 connected to the other side of the secondary winding 46. A pair of filter capacitors 60 and 61 are connected between the return lead 58 and the rectifier leads 54 and 56. A resistor 57 is connected between the connection point 54 and the negative switch terminal B-1, and there is a polarity reversal jumper lead 59 connected to the positive switch terminal A-2. Another resistor 63 is connected from the connection point 56 to the negative switch terminal B-2, and another polarity reversal jumper lead 65 is connected to the positive switch terminal A-1.

Advantageously, the high DC supply voltage provided at the top of the cascaded supply and also the load connected to it are grounded out, i.e., completely discharged, before the reversed polarity potential is applied. When the switch pole 24 is being swung over from the negative terminal B-1 toward the positive terminal A-1 (and vice versa), this pole 24 engages the intermediate switch contact 26, which is labeled "SHORT." This contact 26 serves to ground out the supply voltage and load in conjunction with a similar intermediate switch contact 26'. These contacts 26 and 26' are connected together by a supply and load-discharging resistor 67.

The supply and load-discharging path extends between the header plate 37 of each modular unit and a return connection terminal 69. This discharge path includes a resistor 71 connected between the return terminal 69 and the active end of the contact arm 24' and a similar resistor 73 connected between the active end of the contact arm 24 and the header plate 37. Inviting attention to FIG. 5, it is seen that the resistor 73 is located alongside of the switch arm 24 with its insulated lead 75 connected to the ball contact 108 at the end of the switch arm. The other insulated lead 77 is flexible and wrapped once around the vertical pole shaft 28 with its end being connected at 79 (FIG. 6) to the header plate 37.

The resistor 71 is similarly located alongside of the switch arm 24' and is similarly connected by a wrapped, flexible lead to the return terminal 69. The resistors 71 and 73 suppress current surges during switching.

The tertiary winding 48 provides a DC-isolated AC drive for the power supply primary in the next higher modular unit 12 by connecting this tertiary winding 48 directly to the primary winding 44 of the next adjacent higher modular unit. It is to be noted that one terminal side of each of the tertiary windings 48 is DC referenced by the connection at 81 to the potential present on the header plate 37 of the respective tanks 18. The other side of the tertiary winding 48 is connected to a terminal 83 which is insulated from the header plate 37 for AC voltage at 440 volts, or the like.

The switch 22 includes the mechanically ganged switch arms or poles 24 and 24'. Each pole 24 can contact the pair of active terminals A-1 and B-1, the supply and load discharging terminal 26, all located in the pole plane. One active terminal A-1 is located at one limit of the angular displacement of the pole 24, and this terminal A-1 is connected to the positive voltage lead 65. The other active terminal B-1 is located at the opposite limit of angular displacement of the pole 24 and is connected to the negative voltage lead.

As shown in FIGS. 1, 2 and 3, the switch arms 24 and 24' are mounted on the switch shaft 28 with the same angular orientation so that at the angular position shown in FIG. 6 both switch arms 24 and 24' are engaged with the active voltage terminals B-1 and B-2. As the poles 24 and 24' are simultaneously swung by the pole shaft 28 from the illustrated position, the poles 24 and 24' become grounded to the potential of the return lead 58 by the terminals 26 and 26' before they make contact with the positive voltage terminals A-1 and A-2.

In the electrical system shown in FIG. 6, the bottom modular unit is supplied with electrical AC power of say 440 volts at its input terminals 85 and 87 connected to the primary winding 44 to produce a stepped-up AC voltage across the secondary 46 of the order of 260,000 volts.

The return resistor 71 of the bottom modular unit is connected to the ground terminal 69. The output resistor 73 and lead 77 (FIG. 5) of each modular unit is connected at 79 to the header plate 37 which in turn is connected by a lead 80 to the next higher modular unit. The tertiary terminal 83 is connected by a lead 84 to the primary terminal 85 of the next higher modular unit, while the other primary terminal 87 is connected by a lead 86 to the header plate 37. Thus, one side of the primary 44 of the next higher unit is referenced to the header plate DC voltage. When the poles are electrically connected to the intermediate terminals 26 and 26', the system voltage and the capacitors 60 and 61 are discharged to ground through the resistors 73, 67 and 71. Also, as discussed above, the output terminal 40 and the test load are also advantageously grounded by this arrangement.

The physical arrangement of the power supply components and terminal relative to a pole is illustrated in further detail in the views of FIGS 2 and 3. The corner frame 26 of the dielectric material is spaced from the stack of modular units by spacer brackets 76 of insulator material. The spacer brackets 76 are secured to the underside of the corona rings 20 and are fastened to brackets 34 mounted in the corner frame 36.

The control rod 32 is coupled to the pole shaft 28 in each modular unit 12 by means of a flexible timing belt 30. These belts 30 extend through slots 88 formed in the perimeter of the corona rings 20 and extend into a position immediately above the top portion of the tanks 18. Belt 30 is of the type having inwardly facing teeth which positively mesh with gears 78 on the pole shafts 28 and are affixed to a capture plate 90 mounted on the control rod 32 and further described with reference to FIGS. 7 and 8.

As shown in FIGS. 7 an 8, the limited angular movement needed to rotate the poles between the terminals A-1, 26 and B-1 permits the belts 30 to be split, with its ends 91 and 93 of the split belt 30 being secured by a tooth at the rear side of the capture plate 90. The belts assure a positive turning of the poles in response to angular movement of control rod 32 by the motor 38 (FIGS. 1 and 3).

FIGS. 4 and 5 illustrate the advantageous construction of the poles 24 and 24' and terminals as well as the relative mounting of terminals with respect to a pole. The illustrated pole 24 is formed to include a cylindrical arm structure 82 of insulating material having a transverse bore 84 at one end sized to receive the pole shaft 28, which is formed of dielectric material. Setscrews 86 connect the arm member 82 to the pole shaft 28 at the desired height of the pole plane in which the pole is to be swung. The other end of the cylindrical arm 82 is provided with a longitudinal bore 88. A sleeve 91 slidingly fits within the bore 88 and is fixed at a desired bore position with setscrews such as 92 extending through the wall surrounding the bore 88.

Sleeve 91 has a central bore 94 which terminates at its longitudinal ends in counterbores 96 and 98. Counterbore 98 is threaded to receive a screw 100. A spring 102 is trapped in the counterbore 90 and seats against a shoulder 104 of a push-rod element 106.

The rod 106 is threaded at its end which projects radially away from the sleeve 90 to receive a metal ball-shaped contact 108 of a tough metal such as steel. The ball-shaped contact 108 provides direct spring-loaded contact with the terminals A-1, 26 and B-1.

The terminals are each formed of a straight cylindrical metallic tube 110 of durable conductive metal such as brass. This tube 110 is oriented with its central axis 112 lying in the pole plane. The tube 110 has a sector cut out to form a longitudinal socket contact slot 114 with the walls 116–116' of the slot inclined inwardly generally towards the axis 112, so as to form a pair of converging walls with which the contact ball 108 can make a wedging wiping contact.

The terminal tube 110 is so spaced from the sleeve 90 (by suitable adjustment of the sleeve 90 with set screws 92) that midposition contact of the walls 116 and 116' (as seen in FIG. 5) occurs inside of the full radial extended position of the ball 108. The axial length of tube 110 is sufficient to engage the contact ball to assure wiping contact and to cause inward displacement of the ball as it is swung into contacting position. In other words, the spring 102 becomes somewhat compressed so as to assure firm electrical contact.

The advantage of the pole and terminal construction may be particularly appreciated with reference to FIG. 5. The pole 24 is shown in two terminal contacting positions. The terminal 26 is held by a dielectric support 118 with screws 120. This dielectric support 118 forms part of a support chassis 39 of dielectric material which is hung down from the header plate 37. The chassis 39 is submerged within the transformer oil in the tank 18 and serves to support all of the components of the power supply mentioned above. Terminal A-1 is mounted to the insulating wall 124 of the support chassis 39. The converging walls 116 and 116' of the terminals present extended longitudinal contacting surfaces for the ball 108 so that the lateral alignment of the terminal is not unduly critical and the angular positions of the switch arms are not unduly critical. The radial position of the terminals may be nominally set with radial tolerance variations being automatically compensated by the spring-loaded ball nut. The wiping contact made by the steel ball nuts on the softer brass terminals assures a self-cleaning contact action for reliable long-life operation.

As shown in FIGS. 7 and 8, the fastening of the belt 30 with the control shaft 32 is obtained with the belt capture plate 90. This plate 90 is circular and is provided with a central aperture 130 sized to receive the control shaft 32.

The plate 90 is provided with slots 132 and 132' oriented generally towards the center of the plate and sized to receive end portions of a pair of projecting locating teeth 134 and 134'. The slots 132 and 132' are located on the opposite side of the capture plate 90 from the stack 10 of modular units, so that the belt 30 is partially wrapped around the circular edges 136–136' of plate 90.

A pair of U-shaped clamps 135 and 135' are seated around the belt end portions 91 and 93 after they are engaged with the projecting ends of the teeth 134 and 134' to firmly affix the belt to the plate 90 with a connecting nut and bolt 137. Hence, angular movement of control shaft 32 provides positive corresponding movement of belt 30 without slip. The advantage of using a split belt 30 is that it facilitates assembly of the modular units rather than using integral belts which would require predetermined precision spacing between the control shaft 32 and the pole shafts 28. If the split belt 30 is slightly too long, it is pulled taut, cut to size and its ends 91 and 93 are quickly clamped in place. Moreover, in the event of belt breakage, it can be conveniently replaced, whereas a continuous loop belt would require disassembly of the power supply stack 10 to replace a broken belt. An idler pulley 139 (FIG. 2) on an adjustable arm serves to keep the belt taut.

Below plate 90 is a collar 138 having a flange 140 and a through-bore 142 sized to receive the control shaft 32. The collar 138 is held to the control shaft 32 by a setscrew 144, and it is connected to plate 90 by bolts 146 engaging the flange 140 and extending through arc-shaped slots 148 in the plate 90 to engage nuts 150.

The loosening of bolts 146 enables the respective poles 24 of the units 12 (see FIGS. 2 and 3) to be aligned with one another relative to control shaft 32 for accurate simultaneous switching of all of the modular supply units. The capture plate 90, U-clamps 135, 135', collar 138, flange 140 and all of the bolts and setscrews 137, 144, 146, 150 and the split belt 30 are all made entirely of dielectric materials.

In other words, nothing in the control mechanism 16 above the level of the motor 38 and of its limit switches 152 (FIG. 3) is made of conductive material.

The corona rings 20 are connected to the flange 43 (FIG. 3) on the top of the tank and to the header plate 37 and they extend upward surrounding the top of the tank forming a shallow well 156 (FIGS. 3 and 6) into which is received the bottom 158 of the next tank. The next tank is hung from its header 37 supported upon the three columns 35 of insulating material which rest upon the header 37 of the lower tank. Thus, the corona ring 20 surrounds the top of one tank and also the bottom of the next tank and surrounds all of the electrical connections which extend from one tank up into the next one.

In this novel arrangement, the length of the interconnection leads 80, 84, 86 and 160 is minimized.

The lead 160 serves to interconnect the voltmeter terminals 162 and 164, and there is a high-resistance resistor 166 within each tank extending between the respective voltmeter terminals. The purpose of resistor 166 and terminals 162 and 164 is to provide an internal circuit path extending up through the tanks to the output terminal 40, so that the output potential can be measured by an external DC voltmeter (VM). The resistors 166 cascaded together function as a large-resistance voltage divider relative to the scaling resistance associated with the meter input. Thus, most of the very high DC voltage being measured appears across the cascaded resistors 166, and relatively little voltage appears across the external meter circuit which is connected to the "VM" terminal 162.

Using five modular units in the illustrative embodiment stacked as shown, the DC output voltage at the output terminal 40 is 1,500,000 volts DC reversible to minus 1,500,000 volts DC, with the supply voltage and load being grounded and completely discharged polarity reversals. Using six modular units, the DC output voltage becomes 1,800,000 volts DC reversible to minus 1,800,000 volts DC and so forth. These high voltages are useful for DC insulation testing and similar purposes. The polarity reversal is useful for imposing a reversed voltage stress upon the material under stress and similar purposes.

What is claimed is:

1. A modular ultrahigh DC voltage supply system for delivering a high DC voltage to a load comprising a multiple of high DC voltage power supply modular units, each modular unit including an oil retaining tank of insulator material, with said modular units being vertically stacked and corona rings located at spaced vertical intervals around the tanks to stabilize the voltage gradient along the vertical stack, each of said modular units including switch means in the tanks for reversing the polarity of the DC voltage provided by the respective modular units, said switch means of the respective modular units electrically connecting DC voltages from the power supplies in series to provide a cascaded system high DC voltage with the polarity of the voltage being determined by the positions of the respective switch means, a vertically disposed common switch control means of insulator material and operatively coupled to the switch means in said tanks at vertically spaced intervals, means for moving said common control means in a direction selected to effect a predetermined positioning of the switch means in the tanks to produce a high DC voltage output to the load of corresponding electrical polarity, with a reversal of the DC cascaded voltage being effected by operation of said common control means.

2. The modular ultrahigh DC voltage supply system as claimed in claim 1, wherein each of said switch means includes an electrically grounded terminal operatively interposed to discharge the high cascaded voltage to ground between voltage polarity reversals.

3. The modular ultrahigh DC voltage supply system as claimed in claim 2, wherein each of said switch means includes a pair of spaced electrically connected poles, each pole being angularly movable in a pole plane to contact electrical terminals angularly spaced in said pole planes, said terminals in each of said pole planes being electrically coupled to modular power supply voltages of respective opposite polarity, an intermediate terminal in each of said pole planes being electrically grounded and being located at an angular position to discharge the high cascaded voltage to ground before polarity reversal occurs.

4. The modular ultrahigh DC voltage supply system as claimed in claim 3, wherein said poles are rigidly connected to one another for joint angular motion in their respective polar planes, with one polarity terminal located at one angular position limit of the pole motion and the other polarity terminal located at an opposite angular position limit, with said grounded terminals located at an intermediate angular position of the poles to discharge the high cascaded voltage as the poles are moved from one angular position limit to the other for polarity reversal.

5. The modular ultrahigh DC voltage supply system as claimed in claim 3, wherein said poles are formed of angularly rotatable conductors provided with radially inwardly depressible contact elements, and wherein said terminals are formed of generally straight conductive members located within the circle of angular movement of the depressible elements of the poles to provide wiping self-cleaning contact with the poles.

6. The modular ultrahigh DC voltage supply system as claimed in claim 1, wherein said vertically disposed common control means is a rotatable shaft formed of dielectric material, said shaft extending vertically alongside of the vertical stack of high DC voltage power supply modular units, and means for coupling the rotatable shaft to the poles to angularly swing the poles in their planes for providing switching contact between the poles and terminals.

7 A modular ultrahigh DC voltage supply system for delivering a high DC voltage to a load comprising a plurality of high DC voltage power supply modular units positioned one above another in a vertical stack, said modular units including corona rings extending around their upper ends and surrounding the bottom ends of the next higher units to stabilize the voltage gradient along the vertical stack, each of said modular units including a high DC voltage power supply and switch means for reversing the polarity of the DC voltage provided by the respective power supplies, said switch means of the respective modular units in the stack being electrically interconnected in cascaded relationship with the polarity of the DC voltage at the top of the stack being determined by the positions of the respective switch means, a vertically disposed common switch control means of insulator material extending vertically near the stack of modular units, said common switch control means being operatively coupled to the respective switch means included in said modular units, for moving said switch means in a direction selected to effect a predetermined polarity HIGH DC voltage output at the top of the stack for supply to the load with reversal of the high DC voltage polarity at the top of the stack being effected by operation of said common control means.

8. A modular ultrahigh DC voltage supply system as claimed in claim 7, in which the switch means in each of said modular units includes an intermediate switch terminal and resistor means, said resistor means in the respective modular units becoming interconnected in series to a ground by the respective intermediate terminals of said switch means during polarity reversal operation of said switch means to discharge the voltage from the top of the stack through said resistor means in series before the reversed polarity voltage is applied to the top of the stack.

9. A modular ultrahigh DC voltage supply system as claimed in claim 7, in which each of said modular units includes a strong header plate of electrically conductive material extending across the top of the modular unit and being electrically connected to the corona ring extending around the upper end of the modular unit, a chassis of insulating material being hung from said header plate, and the power supply of the modular unit being mechanically supported by said chassis.

10. A modular ultrahigh DC voltage supply system as claimed in claim 7, in which each of said modular units includes a potential divider resistor adapted to be operatively associated with a DC voltmeter circuit, the respective potential divider resistors in said stack of modular units being connected in series in a circuit extending down from the output voltage supply at the top to a terminal near the bottom of the stack adapted to be connected to a DC voltmeter circuit.

11. An ultrahigh DC voltage supply system adapted for delivering an ultrahigh DC voltage to a load comprising a plurality of modular units positioned one above the other to form a stack of such units, said units in the stack including a transformer having a primary winding, a step-up secondary winding and a tertiary winding, the tertiary winding of each unit which is below another unit being connected to the primary winding of the next higher unit for energizing the transformer therein, said units in the stack each including rectifier means and capacitor means connected to the step-up secondary winding for producing a high DC voltage, each of said units including switch means for effectively reversing the polarity of the high DC voltage provided by the respective unit, the units in the stack being interconnected in cascaded relationship through the respective switch means from the bottom unit to the top unit for cascading the high DC voltages produced by the successive units in the stack to produce an ultrahigh DC voltage available at the top unit in the stack, a common switch control extending upright along near said stack, said common switch control being made of insulating material, and mechanical connection means extending from said switch control to the respective switch means for simultaneously actuating the switch means by operation of said common switch control to reverse the polarity of the ultrahigh DC voltage available from the top unit.

12. An ultrahigh DC voltage supply system adapted for delivering an ultrahigh DC voltage to a load, as claimed in claim 11, in which the switch means in each of said units include a switch arm, two active terminals and an intermediate terminal positioned between the active terminals, one of said active terminals being positive and the other negative, and the intermediate terminals being engaged by the end of the switch arm when the switch means are being actuated to discharge the ultrahigh DC voltage from the top of the stack before the reversed polarity voltage is applied thereof.

13. An ultrahigh DC voltage supply system as claimed in claim 12, in which the switch arms are formed of insulating material and have an electrically conductive contact at the end engageable with the active terminals and with the intermediate terminal, and a resistor mounted on each of the switch arms, said resistor having one end connected to the contact and the other end connected through a flexible lead in circuit to the switch means in the adjacent unit in the stack.

14. An ultrahigh DC voltage supply system adapted for delivering an ultrahigh DC voltage to a load, as claimed in claim 11, in which the transformer in said units each include a core and the units each include a strong electrically conductive header plate extending across the top of the unit, the header plate being connected to the switch means in the unit to be at the high DC voltage level being provided by the respective unit, the transformer core being electrically connected to the header plate to be at the same high DC voltage level as the header plate, and a corona ring extending around the unit near the header plate and being electrically connected to the header plate to be at the same high DC voltage level as the header plate.

15. An ultrahigh DC voltage supply system, as claimed in claim 14, in which each of said units includes an insulating tank positioned below the header plate and being mechanically connected to said header plate: the rectifier means, capacitor means, switch means and transformer being positively within the tank and supported from the header plate, and the tank being adapted to be filled with insulating oil.

16. An ultrahigh DC voltage supply system, as claimed in claim 11, in which the tertiary winding is positioned within the other two windings, and the primary winding is positioned between the tertiary and secondary windings.

17. An ultrahigh DC voltage supply system, as claimed in claim 11, in which the mechanical connection means extending from said common switch control to the respective switch means are toothed belts of insulating material, the belts being split adjacent to the common switch control with their ends being removably secured to the common switch control.

18. An ultrahigh DC voltage supply system, as claimed in claim 17, in which the ends of the belt are removably secured to a member which can be angularly adjusted in position with respect to the common switch control for effectively aligning the actuation of the respective switch means.

* * * * *